United States Patent [19]
Trubey et al.

[11] Patent Number: 5,539,725
[45] Date of Patent: Jul. 23, 1996

[54] PORT ADDRESS RESOLUTION DEVICE

[75] Inventors: Bradley S. Trubey, Raleigh; Anthony D. Walker, Rougemont; Jay L. Smith; Kenneth T. Wilson, both of Raleigh, all of N.C.; David E. Bartolini, Dudley, Mass.

[73] Assignees: International Business Machines Corp., Armonk, N.Y.; 3COM Corporation, Santa Clara, Calif.

[21] Appl. No.: 381,694

[22] Filed: Jan. 31, 1995

[51] Int. Cl.$^6$ .................................................. H04J 3/14
[52] U.S. Cl. .................... 370/13; 370/85.15; 370/85.1; 340/825.08
[58] Field of Search .............................. 370/13, 13.1, 14, 370/15, 16, 16.1, 17, 85.1, 85.2, 85.7, 85.8, 85.12, 85.15, 110.1, 95.1, 95.2, 94.3; 340/825.06, 825.07, 825.08, 825.12

[56] References Cited

U.S. PATENT DOCUMENTS

| | | | |
|---|---|---|---|
| 4,507,777 | 3/1985 | Tucker et al. | 370/16 |
| 5,319,633 | 6/1994 | Geyer et al. | 370/17 |
| 5,335,227 | 8/1994 | Smith et al. | 370/14 |

*Primary Examiner*—Wellington Chin
*Assistant Examiner*—Huy D. Vu
*Attorney, Agent, or Firm*—Stephen T. Keohane; John B. Frisone

[57] ABSTRACT

In a serial network which includes a hub having a plurality of ports each for attaching one or more stations a mechanism for correlating a list of stations developed in a poll cycle to the ports and for detecting and resolving ambiguities when the number of stations does not equal the number of active ports. The mechanism uses a combination of input and output buffers under control of the programmed hub processor for developing a list of stations connected to the hub. When the number of stations does not equal the number of active hub ports an upstream buffer is configured to transmit Duplicate Address MAC frames to a single port and the contents of a downstream buffer are used to resolve the ambiguity either on a single transmission or multiple single port transmissions.

5 Claims, 3 Drawing Sheets

15,539,725

PORT ADDRESS RESOLUTION DEVICE

This invention relates to serial communication networks in general and more particularly to such networks employing hubs provided with ports via which stations may attach to the network and an effective low cost mechanism for establishing a correlation between the stations and the ports to which they are attached.

BACKGROUND

Many serial networks such as the token ring are provided with many ports or access points. In general many of these access points are unoccupied. In addition stations are frequently moved from one access port to another. When failures occur, beacon frames can identify which station may have failed or if a failure exists between two active stations. A technique described in U.S. Pat. No. 4,507,777 (Next Active Upstream Neighbor also known as Neighbor Notification) provides at any point in the network the ability to determine the physical order on the serial network of all upstream stations.

As described in U.S. Pat. No. 5,335,227 it is possible to correlate the sequential addresses of the stations on a network and connected to hub with the active ports thus providing a network topology. U.S. Pat. No. 5,319,633 addresses a special case where more than one station is attached to a single port thus creating a connection ambiguity. The two patents provide a fully adequate technical solution to the problem.

The present invention grew out of an attempt to significantly reduce the cost and complexity of the prior art solution. In the prior art a number of (at least two) very expensive ring adapters are employed to effect the correlation and resolve any ambiguity which would exist in those instances where more than one station is connected to a hub port. Each adapter includes in addition to a variety of integrated circuits a microprocessor. These adapters are in addition to a programmed hub microprocessor with which they communicate.

SUMMARY OF THE INVENTION

The invention contemplates a mechanism for use in a network hub which includes a hub processor for correlating a list of active stations with the ports on the hub to which they are connected and includes: a first input buffer means connected upstream on the network of the first active hub port and adapted to receive signals on the network and interrupt the hub processor when predetermined signals are received; a second input buffer means connected downstream of the last active hub port and adapted to receive signals on the network and interrupt the hub processor when predetermined signals are received; programming means at said hub processor for reading the contents of the said first and second input buffer means when interrupted and for maintaining a sequential list of the stations transmitting selected of the said predetermined signals and comparing the number of stations on the list with the number of active ports at the hub and executing a routine to resolve station to port correlation ambiguities when the number of active ports is not the same as the number of stations on the list of stations.

The invention also contemplates a mechanism for use in a serial network hub for resolving ambiguities in station to port correlations when as set forth above the number of stations recognized in a poll sequence differs from the number of active ports at the hub and includes a output buffer means connected upstream of the ports involved in the ambiguity, for receiving a predetermined message from the hub processor and for transmitting the message under control of the hub processor. An input buffer means connected downstream of the ports involved in the ambiguity for receiving message signals applied to its input and for interrupting the hub processor when a predetermined message has been received and programming means in the processor for loading selected messages into the output buffer for transmission to a selected single downstream port and for reading the contents of the input buffer when interrupted and examining the contents to resolve the ambiguity.

DETAILED DESCRIPTION OF THE INVENTION

Figure 1:
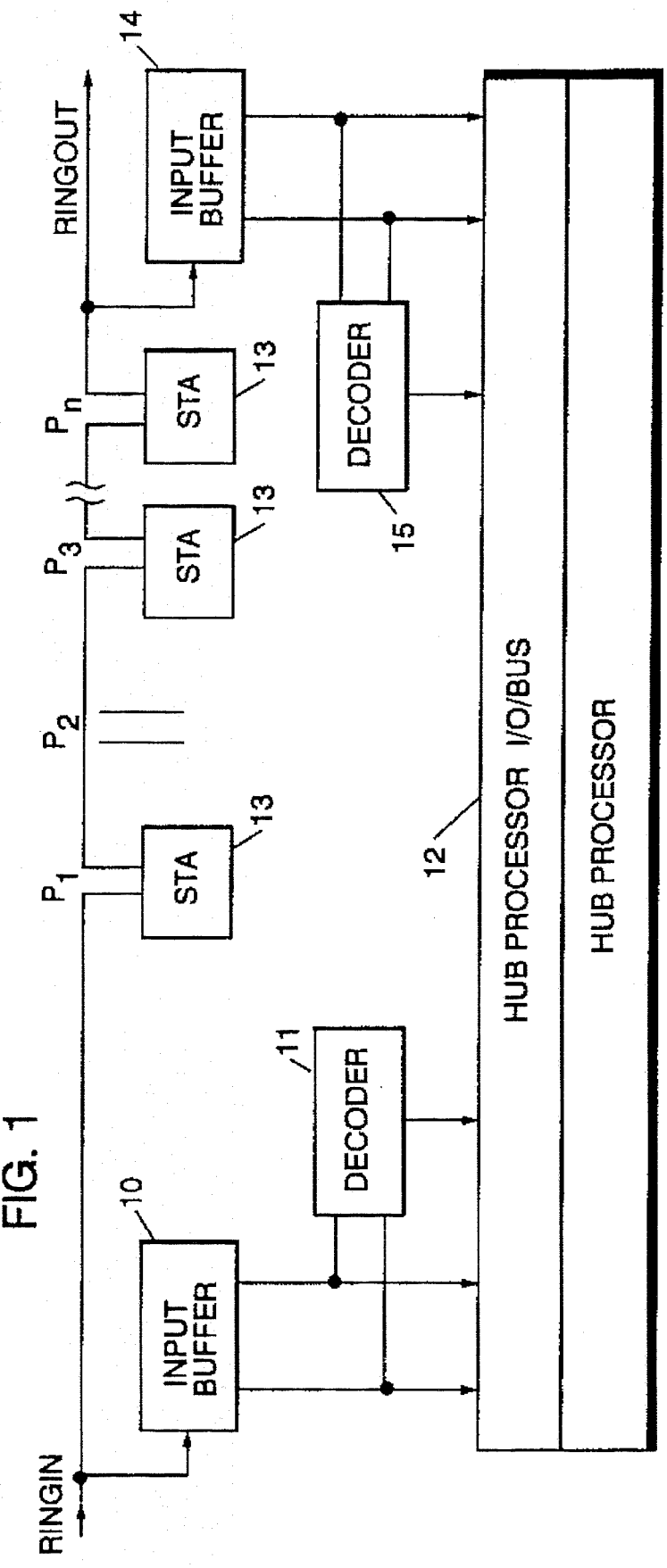
FIG. 1 is a block diagram of a plurality of network hub ports and a mechanism for use in conjunction with the hub processor for generating a list of stations connected to the hub ports.

In FIG. 1 an input buffer 10 is connected to the serial ring upstream of the first hub port P1. Serial data signals on the ring are shifted into the input buffer 10 which stores a sufficient number of signal elements to store any media access control (MAC) frame of interest. Input buffer 10 is provided with a parallel output which is connected to a decoder 11 and the hub processor I/O bus 12.

When an active station 13 is connected to one of the hub port P1–Pn the port is inserted in the serial ring circuit. In the drawing only port P2 is bypassed since no active station 13 is connected thereto. Another input buffer 14 is connected to the ring downstream of the last port Pn. It is similar to input buffer 10 and has its' parallel output connected to a decoder 15 and hub processor I/O bus 12.

The IEEE 802.5 token ring standard defines among others a Neighbor Notification MAC frame which is issued in sequence by all stations on the ring during a ring poll cycle initiated by the ring monitor. This MAC frame includes among other elements the issuing station address, a broadcast address and an address recognized bit which is issued in the reset state by the transmitting station. The very first down stream station which receives the frame sets the address recognized bit. When a Neighbor Notification frame is detected in input buffer 10 decoder 11 interrupts the hub processor which reads the contents of input buffer 11.

When the address recognized bit of a Neighbor Notification frame is in the reset state the hub processor knows that the very next Neighbor Notification frame it receives from input buffer 14 will contain in the source address field the address of the very first station connected to the very first active port. Each succeeding source address in a Neighbor Notification frame received at the input buffer 14 will provide a sequential list of the stations connected to the ports of the hub. The list is closed when a Neighbor Notification frame from input buffer 14 has a reset address recognized bit since there was no station connected to a hub port between the sender and the input buffer 14.

Figure 2:
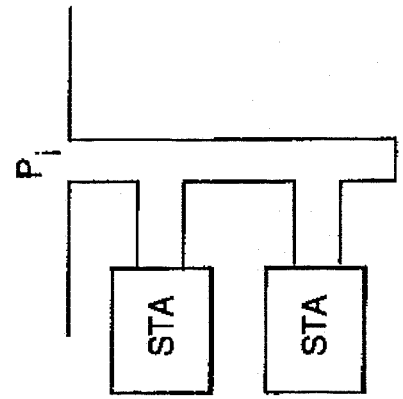
FIG. 2 is a block diagram illustrating the connection of two stations to a single port which connection will result in ambiguity of station to port correlation.

At this point the hub processor totals the number of stations on the sequential list of stations and compares this total to the total number of active ports. If they are equal a simple correlation between the sequential list of stations and the list of active ports result in a reliable identification of the reporting stations and the ports to which they are connected. In those instances where the number of reporting stations does not equal the number of active ports an ambiguity exists. Since some stations connected to the ring do not participate in the ring poll process (all other things being equal) the number of active ports will exceed the number of reporting stations thus creating an ambiguity. Likewise if more than one station is connected to a port as illustrated in FIG. 2, the number of reporting stations will exceed the number active ports, again creating an ambiguity which must be resolved.

Figure 3:
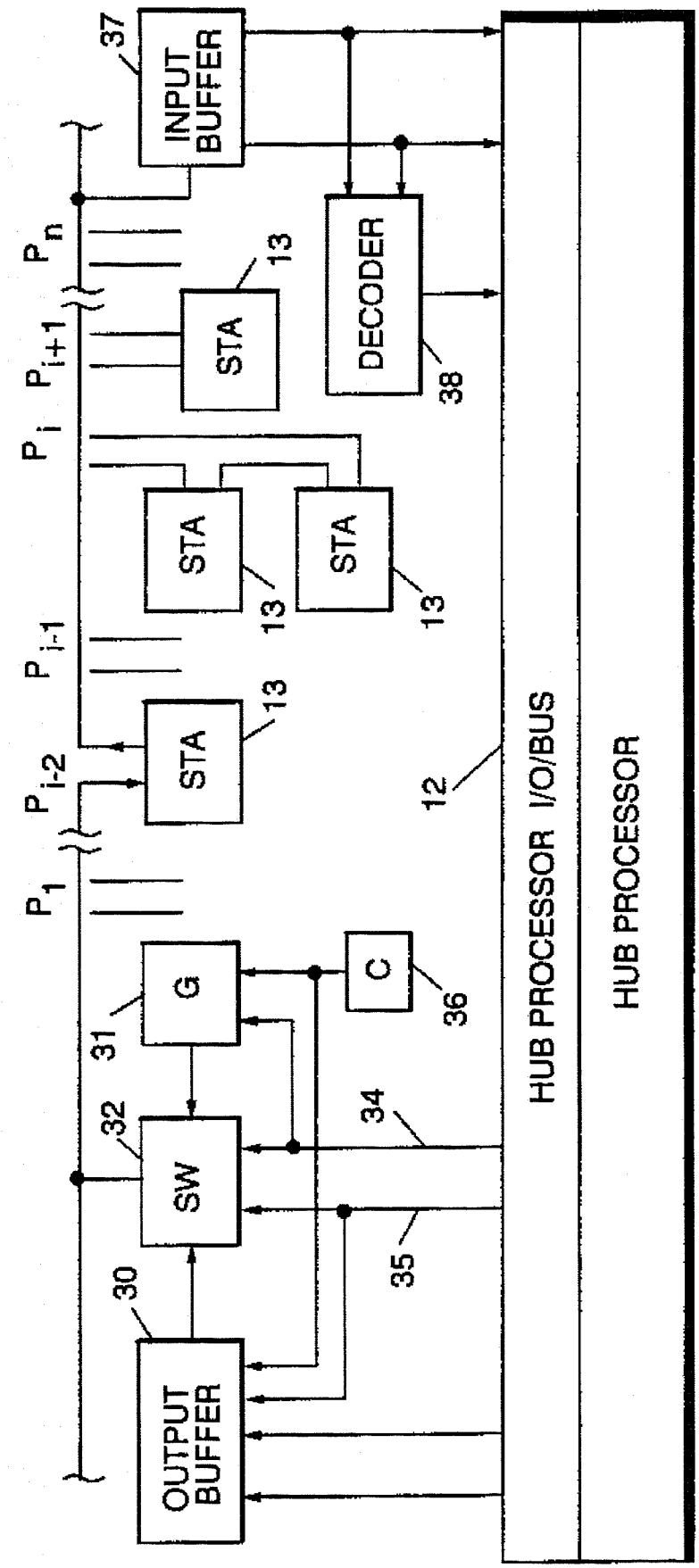
FIG. 3 is a block diagram illustrating a mechanism for use with a hub processor for resolving station to port correlation ambiguities; and, FIG. 4 is a flow chart illustrating the operation of the ambiguity resolution program resident in the hub processor.

Once the list of stations has been compiled and an ambiguity detected, the circuit illustrated in FIG. 3 will yield all of the data necessary to resolve the ambiguity with a high degree of reliability and at a substantial reduction in cost over prior art circuits used for obtaining this same information. In most instances ambiguities can be narrowed to two or three ports since poll cycles take place frequently and a limited number of stations join or leave the ring between cycles. Thus in FIG. 3 three active ports Pi, Pi−2 and Pi+1 along with inactive ports Pi−1, P1 and Pn are illustrated. In the figure only port Pi−2 is illustrated as inserted. Active ports Pi and Pi+1 as well as inactive ports P1, Pi−1 and Pn are illustrated as bypassed and not connected in the serial circuit.

An output buffer 30 is connected to the hub processor by the hub processor I/O bus 12. The processor can load an appropriate MAC frame into the buffer 30. An idle generation and the output buffer 30 can be selectively connected to the ring via switch 32 by the hub processor and a pair of control lines 34 and 35, respectively. A clock source 36 provides clocking signals to the generator 31 and the output buffer 30.

Downstream an input buffer 37 is connected to the ring and receives and buffers the serial signals on the ring. The parallel outputs from the buffer are connected to the hub processor I/O bus and to a decoder circuit 38 which will issue an interrupt to the hub processor over the hub I/O bus when the decoder detects the reception of a predetermined MAC frame in the input buffer 37.

In operation the hub processor loads a MAC frame (Duplicate Address Test) in the output buffer 30. It switches all ports out except Pi−2. It connects idle generator 31 to the ring via switch 32. After idle characters have been transmitted to synchronize the station connected to port Pi−2 it operates switch 32 and output buffer 30 to send the MAC frame loaded in the output buffer 30. The transmitted MAC frame goes to the station(s) connected to port Pi−2. If the addressed station is connected to the port the address recognized bit will be set. The process steps through the addresses and ports until the ambiguity is resolved.

Figure 4:
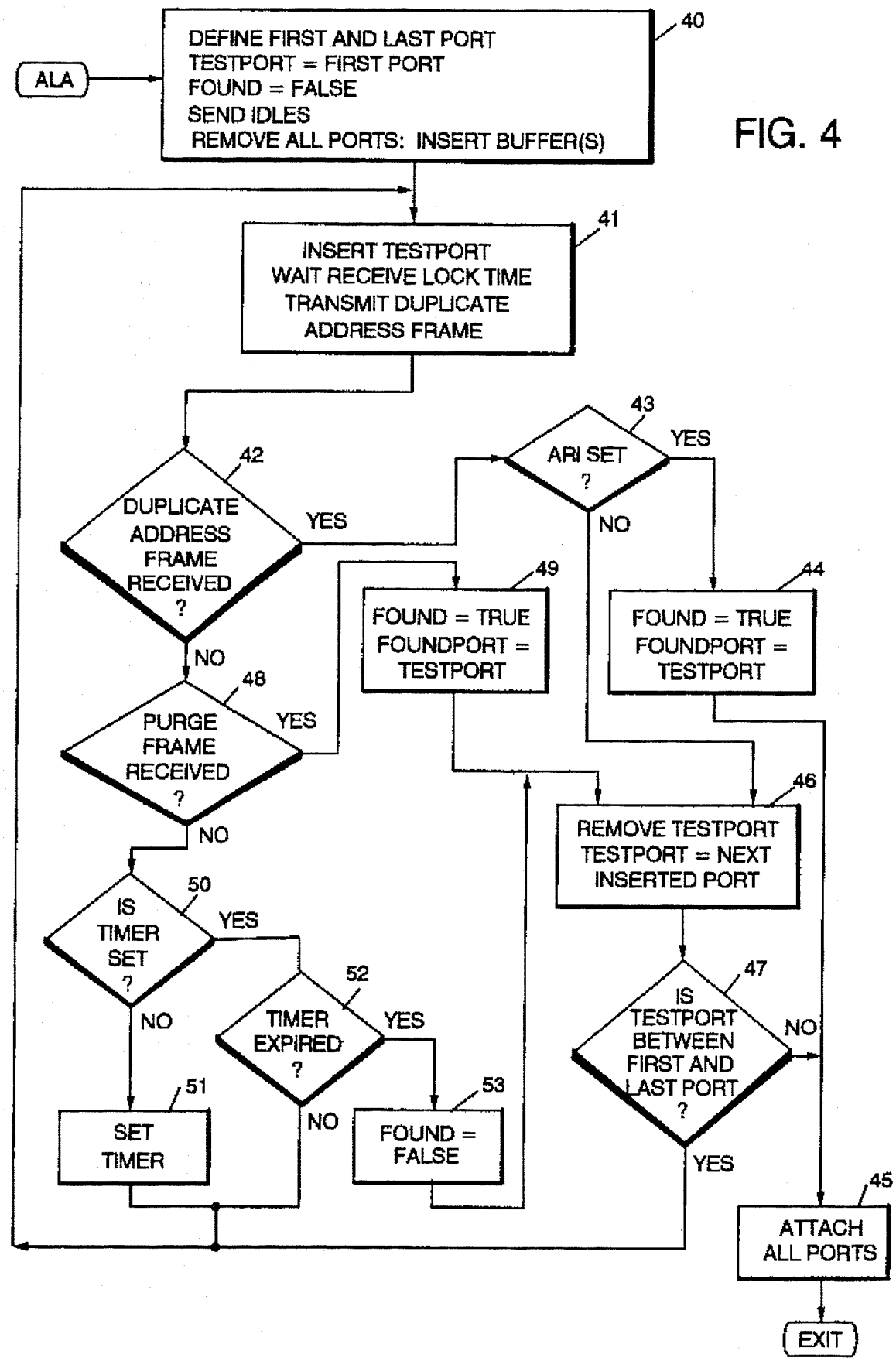

The flow diagram illustrated in FIG. 4 sets forth the test procedure for resolving ambiguities. The first step 40 establishes certain parameters. As stated above, it is not necessary in most instances to step through all of the ports to resolve an ambiguity. Based on prior poll list it is more often than not possible to limit the number of ports involved in the ambiguity. Therefore, the first and last ports to be tested are defined. In a ring which is just starting for the day for example all of the ports (P1–Pn) could be involved. The test port is then set to the first port. Found is set equal to false. Send idles, remove all ports and insert buffers are initiated. In 41 these steps are followed by inserting the test port (defined above in 40). Wait for lock time and then transmit Duplicate Address Test frame.

If a duplicate address test frame is received 42 (at input buffer 37) the address recognized bit is examined 43. If it is set, found is set to true and found port is set to test port 44. Then all of the ports are attached 45 and the program exits. If the address recognized bit is not set, the test port is removed and test port is set equal to the next inserted or active port 46. If the new test port is between the first and last ports 47, the program loops back to 41. If it is out of the range all the ports are attached and the program exits.

If the received MAC frame was a Purge frame 48, this indicates that the station connected at that port is an active monitor which will not respond to the Duplicate Address frame. In this instance found will be set to true and found port will be equal to test port. The program will then go to step 46 described above.

A number of factors could prevent either of the above described MAC frame from appearing at the input buffer 37. The two most common being a delay in transmission or an error condition. The steps set forth below not only accommodate these but any other which may have caused the condition.

If neither MAC frame has been received a timer is checked to see if it has been set. If it has not, it is set 51 and the program loops back to 41. On a subsequent pass the timer will be set and it will be checked for expiration 52. If it has not expired the program loops back through the same path. If the timer has expired, found is set equal to false 53 and the program branches to block 46 which has been previously described above.

While only a single embodiment of the invention has been described and illustrated in detail, it will be understood by those skilled in this art that changes and modifications to the invention can be made without departing from the spirit and scope of the invention.

We claim:

1. A mechanism for use in a serial network hub which includes, a plurality of ports for attaching stations to the network, a programmed hub processor having an input/output bus for generating and correlating a list of active ports with the stations on the hub to which they are connected and includes:

a first input buffer means connected upstream on the network of the first active hub port and adapted to receive signals on the network and interrupt the hub processor via the input/output bus when predetermined signals are received;

a second input buffer means connected downstream of the last active hub port and adapted to receive signals on the network and interrupt the hub processor via the input/output bus when predetermined signals are received; and, programming means at said hub processor for reading the contents of the said first and second input buffer means when interrupted and for maintaining a sequential list of the stations transmitting selected of the said predetermined signals and comparing the number of stations on the list with the number of active ports at the hub and executing a routine to resolve station to port correlation ambiguities when the number of active ports is not the same as the number of stations on the list of stations.

2. The mechanism set forth in claim 1 in which the predetermined signals are neighbor notification media access control frames.

3. A mechanism for use in a serial network hub which includes, a plurality of ports for attaching stations to the network, a programmed hub processor having an input/output bus for resolving ambiguities in station to port correlations when the number of stations recognized in a poll sequence differs from the number of active ports at the hub and includes:

an output buffer means connected upstream of the ports for receiving a predetermined message from the hub processor and for transmitting the message under control of the hub processor;

an input buffer means connected downstream of the ports for receiving message signals applied to its input and for interrupting the hub processor when a predetermined message has been received; and, programming means for loading selected message into the output buffer for transmission to a selected single downstream port and for reading the contents of the input buffer when interrupted and examining the contents to resolve the ambiguities.

4. The mechanism set forth in claim 3 in which the message transmitted from the output buffer means under control of the hub processor is a number of idle characters followed by a Duplicate Address Test media access control frame.

5. The mechanism set forth in either claims 3 or 4 in which the output buffer means includes:

a buffer for receiving message signals from the programmed hub processor via the input/output bus;

an idle character generator; and, switching means under control of the programmed hub processor for sequentially connecting the idle character generator and the output buffer to the serial network.

* * * * *